US009543054B2

(12) United States Patent
Ban et al.

(10) Patent No.: US 9,543,054 B2
(45) Date of Patent: Jan. 10, 2017

(54) METHOD OF FABRICATING ELECTRODES INCLUDING HIGH-CAPACITY, BINDER-FREE ANODES FOR LITHIUM-ION BATTERIES

(71) Applicant: Alliance for Sustainable Energy, LLC, Denver, CO (US)

(72) Inventors: Chunmei Ban, Littleton, CO (US); Zhuangchun Wu, Lakewood, CO (US); Anne C. Dillon, Boulder, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 99 days.

(21) Appl. No.: 13/672,486

(22) Filed: Nov. 8, 2012

(65) Prior Publication Data

US 2013/0065130 A1  Mar. 14, 2013

Related U.S. Application Data

(63) Continuation of application No. 12/565,500, filed on Sep. 23, 2009, now abandoned.

(51) Int. Cl.
*H01B 1/04* (2006.01)
*H01M 4/485* (2010.01)
(Continued)

(52) U.S. Cl.
CPC ............... *H01B 1/04* (2013.01); *B01J 19/08* (2013.01); *H01B 1/00* (2013.01); *H01B 1/08* (2013.01);
(Continued)

(58) Field of Classification Search
CPC ..................................................... C01G 49/06
(Continued)

(56) References Cited

U.S. PATENT DOCUMENTS 4,459,276 A  *  7/1984  Nobuoka ............... B82Y 30/00
                                                              106/456
4,466,470 A      8/1984  Bruder
                    (Continued)

OTHER PUBLICATIONS

Larcher et al., "Combined XRD, EXAFS, and Mössbauer Studies of the Reduction by Lithium of α-Fe2O3 with Various Particle Sizes", 2003, Journal of The Electrochemical Society, vol. 150, pp. A1643-A1650.*

(Continued)

*Primary Examiner* — Barbara Gilliam
*Assistant Examiner* — Robert S Carrico
(74) *Attorney, Agent, or Firm* — Michael A. McIntyre

(57) ABSTRACT

An electrode (110) is provided that may be used in an electrochemical device (100) such as an energy storage/discharge device, e.g., a lithium-ion battery, or an electrochromic device, e.g., a smart window. Hydrothermal techniques and vacuum filtration methods were applied to fabricate the electrode (110). The electrode (110) includes an active portion (140) that is made up of electrochemically active nanoparticles, with one embodiment utilizing 3d-transition metal oxides to provide the electrochemical capacity of the electrode (110). The active material (140) may include other electrochemical materials, such as silicon, tin, lithium manganese oxide, and lithium iron phosphate. The electrode (110) also includes a matrix or net (170) of electrically conductive nanomaterial that acts to connect and/or bind the active nanoparticles (140) such that no binder material is required in the electrode (110), which allows more active materials (140) to be included to improve energy density and other desirable characteristics of the electrode. The matrix material (170) may take the form of carbon nanotubes, such as single-wall, double-wall, and/or multi-wall nanotubes, and be provided as about 2 to 30 percent weight of the electrode (110) with the rest being the active material (140).

11 Claims, 6 Drawing Sheets

(51) Int. Cl.
*H01B 1/00* (2006.01)
*H01M 4/48* (2010.01)
*H01B 1/08* (2006.01)
*H01M 4/52* (2010.01)
*B01J 19/08* (2006.01)
*H01M 4/04* (2006.01)
*H01M 4/62* (2006.01)
*H01M 4/131* (2010.01)
*H01M 10/0525* (2010.01)
*H01M 4/02* (2006.01)
*B82Y 30/00* (2011.01)

(52) U.S. Cl.
CPC .......... *H01M 4/0471* (2013.01); *H01M 4/131* (2013.01); *H01M 4/48* (2013.01); *H01M 4/485* (2013.01); *H01M 4/52* (2013.01); *H01M 4/625* (2013.01); *H01M 10/0525* (2013.01); *B82Y 30/00* (2013.01); *H01M 4/02* (2013.01); *H01M 4/0404* (2013.01); *Y02E 60/122* (2013.01); *Y02T 10/7011* (2013.01)

(58) Field of Classification Search
USPC .......................................................... 429/232
See application file for complete search history.

(56) References Cited

U.S. PATENT DOCUMENTS

| | | | | |
|---|---|---|---|---|
| 4,487,627 | A * | 12/1984 | Umemura | B22F 1/02 148/105 |
| 5,955,220 | A | 9/1999 | Takada et al. | |
| 6,255,017 | B1 | 7/2001 | Turner | |
| 6,270,925 | B1 | 8/2001 | Takada et al. | |
| 6,432,585 | B1 * | 8/2002 | Kawakami et al. | 429/233 |
| 7,214,446 | B1 * | 5/2007 | Bi et al. | 429/231.2 |
| 2002/0085968 | A1 * | 7/2002 | Smalley et al. | 422/198 |
| 2002/0172869 | A1 * | 11/2002 | Kudo et al. | 429/232 |
| 2004/0126659 | A1 | 7/2004 | Graetz et al. | |
| 2004/0131934 | A1 | 7/2004 | Sugnaux et al. | |
| 2004/0197659 | A1 * | 10/2004 | Kumar et al. | 429/231.3 |
| 2006/0216602 | A1 * | 9/2006 | Larouche | B82Y 30/00 429/231.8 |
| 2007/0202403 | A1 * | 8/2007 | Oh et al. | 429/217 |
| 2007/0277876 | A1 | 12/2007 | Huang et al. | |
| 2008/0038635 | A1 * | 2/2008 | Sheem et al. | 429/212 |
| 2008/0292887 | A1 | 11/2008 | Kim et al. | |
| 2008/0299460 | A1 | 12/2008 | Feng et al. | |
| 2009/0075171 | A1 | 3/2009 | Feng et al. | |
| 2009/0098453 | A1 | 4/2009 | Liu et al. | |
| 2009/0098463 | A1 | 4/2009 | Liu et al. | |
| 2009/0117467 | A1 * | 5/2009 | Zhamu et al. | 429/231.8 |
| 2009/0269511 | A1 * | 10/2009 | Zhamu | B82Y 30/00 427/558 |
| 2010/0055568 | A1 * | 3/2010 | Kim et al. | 429/231.1 |
| 2011/0070495 | A1 | 3/2011 | Ban et al. | |

OTHER PUBLICATIONS

Liu et al. "Electrochemical performance of α-Fe2O3 nanorods as anode material for lithium-ion cells", 2009, Electrochimica Acta, vol. 54, pp. 1733-1736.*
Peng et al., "Synthesis of Magnetite Nanorods through Reduction of beta-FeOOH", Chemistry Letters, 2005, vol. 34, No. 5, pp. 636-637.*
Wang et al., "Synthesis of beta-FeOOH and alpha-Fe2O3 nanorods and electrochemical properties of veta-FeOOH", Journal of Materials Chemistry, 2004, vol. 14, pp. 905-907.*
Ban et al., "High-energy density metal oxide anodes for Li-ion batteries", The Electrochemical Society, 216th ECS Meeting, Abstract #666, http://www.ecsdl.org/getpdf/servlet/GetPDFServlet?filetype=pdf &id=MAECES000902000008000666000001&idtype=cvips &prog=search, 2009, p. 1-1.
Ban et al., "Nanostructured Fe3O4/SWNT Electrode: Binder-Free and High-Rate Li-Ion Anode", Advanced Energy Materials, 2010, vol. 22, pp. E145-E149.
Huang, "Coating Carbon Nanotubes with Iron Oxide Using Methanol-Thermal Reaction", Elsevier—Science Direct, 2007, vol. 61, pp. 697-700.
Hung, "Laser Directed Growth of Carbon-Based Nanostructures by Plasmon Resonant Chemical Vapor Deposition", American Chemical Society, Aug. 19, 2008, vol. 8, No. 10, pp. 3278-3282.
Liu, "Electrochemical performance of alpha-Fe2O3 nanorods material for lithium-ion cells", Electrochemica Acta, 2009, vol. 54, pp. 1733-1736.
Riley, "Nanostructured Metal Oxide Anodes", 2009 DOE Merit Review, NREL/PR-500-45860.
Wu, "Transparent, Conductive Carbon Nanotube Films", Science, Aug. 27, 2004, vol. 305, pp. 1273-1276.
International Preliminary Report on Patentability International (PCT) Application No. PCT/US2010/044346, issued Mar. 27, 2012.
International Search Report and Written Opinion of the international Searching Authority dated Sep. 29, 2010, for International Application No. PCT/US2010/044346.

* cited by examiner

METHOD OF FABRICATING ELECTRODES INCLUDING HIGH-CAPACITY, BINDER-FREE ANODES FOR LITHIUM-ION BATTERIES

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

CROSS-REFERENCE TO RELATED APPLICATIONS

This application claims priority to U.S. patent application Ser. No. 12/565,500, filed Sep. 23, 2009, the contents of which are incorporated by reference in their entirety.

BACKGROUND

Energy storage requirements continue to grow as the electronic, portable power, and energy infrastructure industries expand and transition away from more historic non-renewable energy supplies. For example, there has been a renewed interest in batteries and other energy storage devices for use in electric and hybrid automobiles, and this has been caused, in part, by volatile oil costs and the possibility of catastrophic climate change that has greatly pushed scientific attention toward the development of electrical and hybrid vehicles powered by rechargeable batteries, e.g., rechargeable lithium-ion (Li-ion) batteries that may be powered with electricity from renewable sources. Similarly, there is ongoing research in ways to make lighter and more efficient batteries for electronic devices ranging from portable computers to cellular phones and other wireless communication devices.

General goals for battery manufacturers include providing long life and significant power levels with the least amount of weight while also providing a recharging functionality. More specifically, one of the most critical parameters for new energy storage technologies and designs is the demand for higher energy densities (i.e., energy storage per unit of battery or storage device weight). Additionally, there is growing concern over potential long term environmental impacts of product manufacture and use, and, the energy storage industry continues to search for storage devices that can make use of environmentally benign or green materials while still providing desirable energy densities. Unfortunately, many existing electrode materials that have high durable capacities and good rate capability are expensive and/or are toxic. Furthermore, improved energy density and rate capabilities are still demanded by the battery and other energy storage industries such as for battery designs facilitating a successful deployment of a fleet of electric vehicles. Hence, there remains a need for electrodes fabricated from abundant and nontoxic elements with durable high-reversible capacity and highly improved rate capability.

In the search for electrode materials for electrochemical devices such as batteries, smart windows, and the like, many efforts have centered on materials with structures that can intercalate small cations without major structural changes occurring. For example, lithium-on batteries are one of the most prevalent energy storage devices for portable electronics and for vehicles because these batteries offer relatively high energy densities and longer lifespans than comparable technologies. Lithium-ion batteries utilizing existing technologies and electrode design have sufficient specific energy and power densities to meet some targets for hybrid electric vehicles (HEVs) and plug-in hybrid electric vehicles (PHEVs) for up to a 40 mile range.

However, significant improvements in lifetimes of batteries along with reductions in costs and use of less toxic electrode materials are needed before lithium-ion batteries are employed fully in the transportation industry. Increasing energy density of electrode materials, for example, is desirable to support use of electrochemical devices such as lithium-ion batteries being used in fully electric vehicles. Note, also, that materials for electrochromic applications and devices are required to meet many of the same criteria as called for in batteries, and the following description may use the word electrochemical device to apply to nearly any electric device with an electrode such as a battery or an electrochromic device.

With reference to some exemplary electrode research or design efforts, three-d-transition metal oxides ($Fe_2O_3$, $Fe_3O_4$, $MoO_3$, CoO, NiO, and the like) are capable of $Li^+$ insertion/extraction in excess of 6 $Li^+$ per formula unit, resulting in a larger reversible capacity than commercially employed graphite. For example, the specific capacity of metal oxide anodes can be over 1000 mAh/g, which is approximately three times higher than that of graphitic carbons. Differing from the intercalation mechanism occurring with graphite, the 3d transition metal oxides are reduced in a conversion reaction to small metal clusters, and the oxygen reacts with the lithium to form $Li_2O$. In general, this leads to volumetric expansion and destruction of the structure upon electrochemical cycling, which, for bulk particles, typically results in capacity loss during cycling, even at very low rates.

It has also been reported, for example, that $MoO_3$ nanoparticles that react with approximately 5.7 Li ions may lead to an electrode with a durable reversible capacity as high as 1050 mAh/g. Additionally, an $Fe_3O_4$-based Cu nano-architectured electrode has been developed that allowed for small diffusion paths and better electrical and mechanical contact by using a Cu-nanopillar current collector, enabling improved rate capability. Various groups have also reported the use of metal oxides with optimal sizes and carbon nanostructures or nanostructures with carbon-modified surfaces to improve reversible capacity and rate capability. Highly dispersed $Fe_3O_4$ nanocrystals have been used in a carbon matrix that provided an electrode that had a reversible capacity of about 600 mAh/g at 0.1C rate. "C" represents "charge rate" signifying a charge or discharge rate equal to the capacity of a battery divided by one (1) hour. Further studies have shown electrodes formed with carbon/$Fe_3O_4$ composite nanofibers fabricated with an electrospinning technique had a reversible capacity of 1007 mAh/g at 0.1C and 623 mAh/g at 2C rate. While these efforts have shown improvements in electrode technologies, these designs have not been widely adopted as there remains a need for even higher energy densities and other improvements in electrodes before such electrodes will be implemented by the transportation and other industries. For example, electrodes formed of more green materials are needed with high reversible capacities and improved rate capabilities as well as desirable energy densities.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

An electrode is provided that may be used in an electrochemical device such as an energy storage/discharge device (e.g., a lithium-ion battery or the like) or an electrochromic device (e.g., a smart window). The electrode includes an active portion that is made up of electrochemically active nanoparticles, with one embodiment utilizing 3d-transition metal oxides to provide the electrochemical capacity of the electrode. The electrode also includes a matrix or net of electrically conductive nanomaterial that acts to connect and/or bind the active nanoparticles such that no binder material is required (which allows more active materials to be included to improve energy density and other desirable characteristics of the electrode).

The matrix material may take the form of carbon nanotubes (such as single-wall, double-wall, and/or multi-wall nanotubes), carbon fibers, fullerenes, graphene, and/or any carbon based nanostructured material including doped carbon nanostructures, e.g., boron or nitrogen-doped nanotubes and/or BCN nanostructures (e.g., any hybrid nanotubes constructed of boron (B), carbon (C), and/or nitrogen (N) elements or other nanostructures of the so-called BCN material system) or the like. The matrix material may be provided as about 2 to 30 percent weight of the electrode with the rest being the active material. For example, the electrode may be formed by substantially uniformly mixing/combining 5 to 10 percent by weight carbon SWNTs with 90 to 95 percent by weight iron oxide (or another active material such as silicon, lithium iron phosphate, lithium manganese phosphate, or a combination of these materials and/or metal oxides) in the form of nanorods, nanoparticles, or the like.

According to another aspect, an electrochemical device is provided with a cathode layer and an anode layer (with an optional electrolyte therebetween). The anode layer includes an electrochemically active nanomaterial and a connective net that binds the active nanomaterial within the anode layer. The connective net may include electrically conductive nanoparticles such as carbon SWNTs or the like to provide at 2 to 30 percent by weight. The active nanomaterial may take the form of nanorods of metal oxide such as an iron oxide, and since no binder is required, the metal oxide nanorods may make up 70 or more percent by weight of the electrode.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Figure 1A:
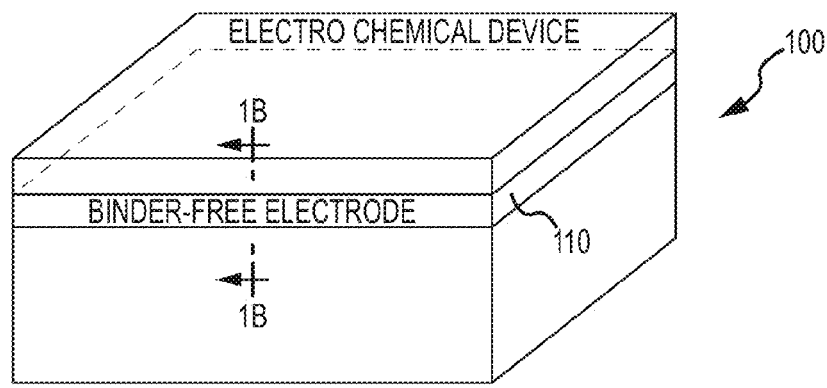
FIG. 1A illustrates in simplified form an electrochemical device such as a battery, electrochromic device, or the like with one or more electrode as described herein.

The following description is directed generally toward methods of manufacturing or providing electrodes with high reversible capacity and enhanced rate capability and to electrochemical devices that include such electrodes (e.g., as a binderless anode of an Li-ion battery or the like). It may be useful to provide a relatively specific example and then to describe the electrode in a more general manner and its use in a battery with reference to FIGS. 1A to 2. The description then proceeds to more specific test results achieved in testing several exemplary electrode implementations with reference to FIGS. 3 to 8. FIG. 9 then provides an overview of a process for fabricating an electrochemical device with one or more of the electrodes taught herein that is useful for achieving significantly higher energy capacities through the use of an electrically-conductive connective matrix formed of nanomaterials such as carbon single-wall nanotubes (SWNTs) or the like. In other words, the connective matrix is a smaller weight percentage component of the electrode (e.g., typically, less than about 30 percent by weight of the electrode material and, often, less than about 10 percent such as about 5 percent by weight) that may be thought of as a conductive additive while the active material portion such as iron oxide contributes the main electrochemical capacity of the electrode.

In one exemplary electrode, highly improved electrochemical performance was observed by using a nano iron (II, III) oxide ($Fe_3O_4$) binder-free electrode, which was synthesized with a hydrothermal process and vacuum filtration method. The electrode may be used in nearly any electrochemical device and contained $Fe_3O_4$ nanorods as the active material for lithium storage and carbon single-wall nanotubes (SWNTs) as a conductive additive (or electrically conductive net or matrix. The inclusion of SWNTs improves both mechanical integrity and electrical conductivity as well as allowing a high volumetric energy density to be achieved with the electrode. In some cases, the matrix or net makes up about 30 percent or less by weight of the electrode or electrode layer. For example, the highest, or at least a relatively high, reversible capacity was obtained using only about 5 percent by weight of SWNTs in the binder-free electrode.

The reversible capacity of the electrode when coupled with a lithium metal electrode in a Li-ion battery for example reaches 1000 mAh/g at C rate and was sustained over 100 cycles with an acceptable or desirable volumetric capacity. Furthermore, testing of this exemplary electrode showed a high rate capability and a stable capacity of about 800 mAh/g at 5C and a stable capacity of about 600 mAh/g at 10C. Scanning electron microscopy (SEM) of the electrode revealed that the $Fe_3O_4$ nanorods were substantially uniformly suspended in a conductive matrix of only 5 percent by weight SWNTs, which, in part, provides the improved rate capability and durability. Raman spectroscopy was also employed during testing to characterize the SWNTs in the electrode and explain the Li-insertion process. Further, AC impedance spectroscopy of the electrode indicated the Li charge/discharge after the fifth cycle was highly reversible.

The electrodes taught in this description with reference to the attached figures may be utilized in nearly any electrochemical device including electrodes/layers in batteries ultra capacitors, fuel cells, water-splitting electrodes, and other energy storage/discharge devices and in electrochromic devices such as smart windows and the like. FIG. 1A illustrates simplistically and generally such an electrochemical device 100 that may be in the form of a stack or otherwise include a number of layers of materials that provide particular functions. For example, the device may be an energy storage device with a pair of electrodes (an anode and a cathode) separated by an electrolyte layer. As shown, the device 100 includes a layer of electrode material or electrode 110 that may be configured to be binder-free. In contrast, a conventional electrode for a battery or storage device may have an active material (e.g., about 80 percent by weight), a conductive additive (e.g., 10 percent by weight of carbon black or the like), and a binder (e.g., 10 percent by weight of a polymer) that holds the active material and conductive additive together and assists in binding with adjoining layers/substrates.

Figure 1B:
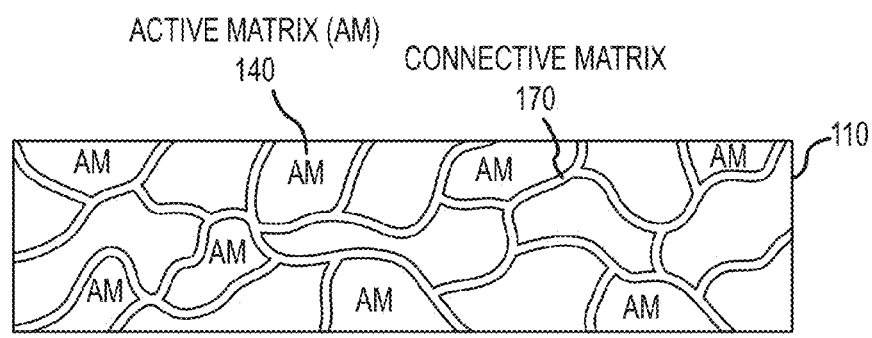
FIG. 1B illustrates a sectional view showing schematically or functionally two significant portions of the electrode including an electrically or electrochemically active material portion (e.g., iron oxide or other active material nanorods) and a connective matrix (e.g., an additive that may be made up of, for example, carbon nanotubes)

FIG. 1B illustrates a functional section view of the electrode 110 of electrochemical device 100 that shows that the main two components/portions of the electrode are an electrically conductive, connective matrix/net 170 (with some impurities typically also being present in relatively small amounts) and an electrochemically active material 140. The active material 140 contributes the electrochemical capacity of the device 100 while the connective matrix 170 acts to electrically connect and support the active material 140 and eliminates the need for binder materials, and, as a result, substantially more active material 140 may be provided in the electrode 110 increasing, for example, its energy density.

In one example, the connective matrix 170 is provided as about 2 to about 30 percent weight of the electrode material and is an electrically conductive material or additive such in nanomaterial form. For example, but not as a limitation, the connective matrix 170 may take the form of carbon nanomaterial. In some cases, the nanomaterial may be fullerenes (such as buckyballs or cylindrical fullerenes) and/or nanotubes (e.g., SWNTs, double-wall nanotubes, multi-wall nanotubes, or the like). In some specific implementations, the connective matrix 170 is formed of carbon SWNTs provided at 2 to 30 percent by weight (with some more particular examples using 5 to 30 percent by weight carbon SWNTs such as about 5 to 10 percent by weight).

The active material 140 may also take a variety of forms to provide the electrode 110 such as a metal oxide nanomaterial provided as 70 to 98 percent by weight of the electrode material (e.g., all or substantially all of the material of the electrode 110 not provided or made up of the matrix 170 such as about 90 to 95 percent by weight when the matrix 170 provides about 5 to 10 percent by weight of the electrode 110). In one example, the nanomaterial of the active material is provided in the form of a metal oxide nanoparticles, and, more specifically, nanorods of iron oxide. In other examples, though, the nanomaterials are nanoparticles (such as but not limited to nanorods) of silicon, tin, molybdenum oxide, vanadium oxide, manganese oxide, nickel oxide, cobalt oxide, lithium cobalt oxide, lithium manganese oxide, lithium iron phosphate, lithium manganese phosphate, graphite, carbon, nanographite, mixed metal oxide, mixed metal, and/or a combination thereof.

Figure 2:
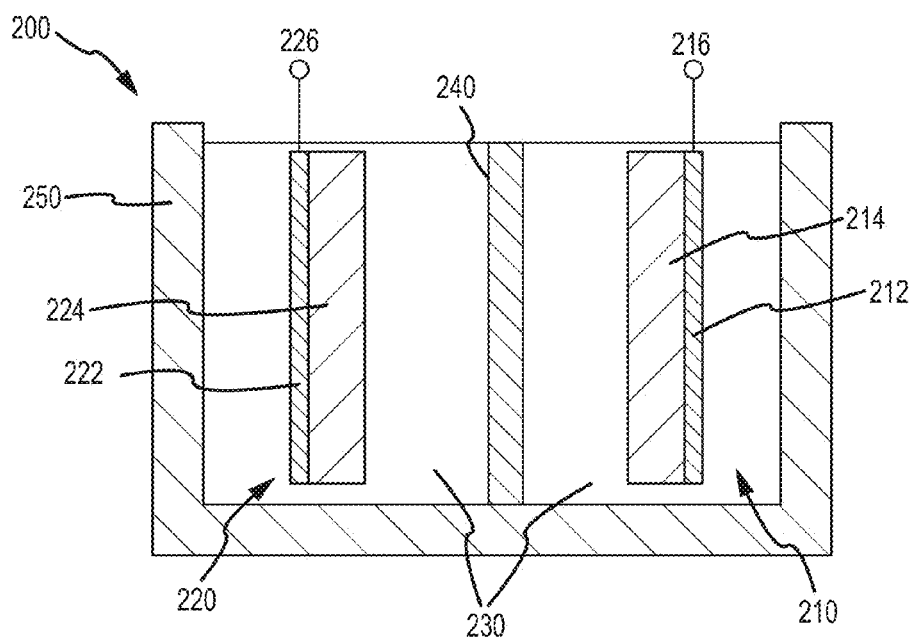
FIG. 2 illustrates a battery such as a lithium-ion battery (i.e., an exemplary electrochemical device) including an electrode (i.e., an anode) with a high-capacity, binder-free electrode formed as taught herein.
Figure 3:
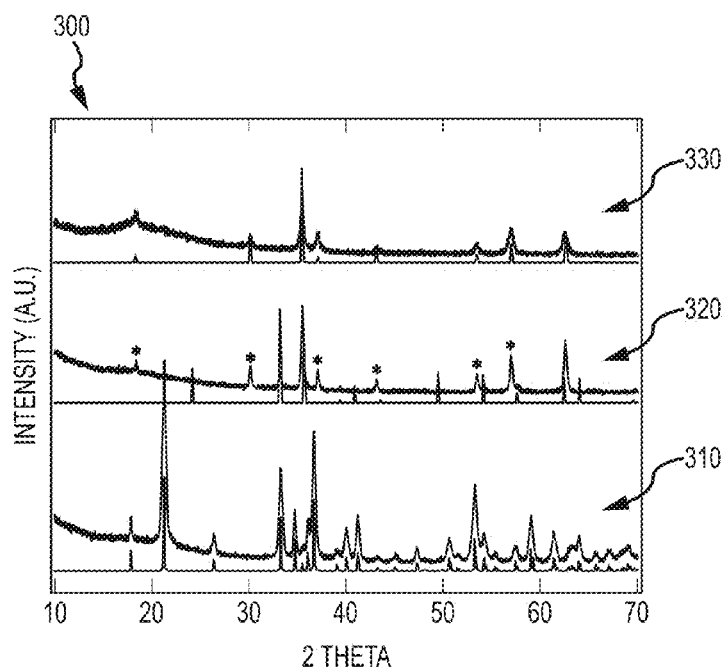
FIG. 3 illustrates an X-ray diffraction (XRD) spectra of test materials including nanorod precursor materials, processed/heated active or nanorod materials, and electrode materials including single wall nanotubes (SWNTs)

FIG. 2 illustrates a particular device 200, e.g., a battery that may take the form of a lithium-ion battery in practice. The battery 200 includes a container 250, an anode 210, a cathode 220, an electrolyte 230, and a separator 240 (optional and may be a polyethylene or the like component). The anode 210 may include a negative current collector layer 212 such as metal foil (e.g., copper foil or the like) and an electrode according to the present description may be provided as shown at 214, e.g., a layer of material including a nanomaterial connective matrix and a nanoparticle active material portion substantially uniformly distributed about the matrix. The anode/electrode 214 is adhered to the surface of the collector 212 with the matrix material rather than an additional binder.

The cathode 220 may include a positive current collector layer 222 and an active material 224 disposed thereon (which may be formed in the manner of the electrodes described herein or in other ways as known in the battery industry such as using a lithium foil or lithium transition metal oxide when the battery 200 is a lithium-ion battery). The anode 210, the cathode 220, the electrolyte 230, and the separator 240 are positioned within the container 250, and a negative terminal 216 and a positive terminal 226 are disposed on or electrically connected to the negative current collector layer 216 of the anode 210 and the positive current collector layer 222 of the cathode 220 to allow connection of the battery 200 to an electrical circuit/power use or storage circuit (not shown).

At this point, it may be useful to provide a more specific example of a design for an electrode (e.g., electrode 110 or 214 of FIGS. 1A to 2) for use in an electrochemical device. In one example, an electrode was provided by suspending $Fe_3O_4$ nanorods into a conductive and durable matrix made with long, crystalline SWNTs. There was no polymer binder provided in the electrode, and this enabled or allowed a significantly higher loading of active material (i.e., the 10 percent or so by weight of the electrode that would be typically taken up by binder could be replaced by active material). The elimination of binder also allowed high volumetric capacities to be achieved with the electrode design. Further, due to the ballistic conductance and high strength of SWNTs, the electrode had the ability to accommodate large volume changes and also provided very significant improvements in rate capability, with stable capacity of 600 mAh/g at 10 C in one example.

In one electrode formation process, a suspension containing FeOOH nanorods and carbon SWNTs was employed to make a nano-$Fe_3O_4$ electrode via vacuum filtration. The FeOOH nanostructured precursor (e.g., with widths of 40 nm, lengths of 250 nm, and thicknesses of 20 nm) was formed from the reaction of $FeCl_3$ and NaOH in a hydrothermal process. An XRD spectra of the as-prepared nanorods and reference α-FeOOH phase (goethite, JCPDS 81-0463) are shown in the graph 300 of FIG. 3 at 310. "JCPDS" signifies "Joint Committee on Power Diffraction Standards." In the XRD spectra of 330, all of the reflection peaks can be indexed to the tetragonal α-FeOOH phase. After heating the FeOOH nanorods to 450° C. in an argon atmosphere, a mixture of α-$Fe_2O_3$ (hematite) and $Fe_3O_4$ (magnetite) was observed. The spectra or graph portion shown at 320 shows the XRD patterns of the heated product and reference pattern of α-$Fe_2O_3$ (JCPDS 33-0664). Some reflection peaks (shown with "*" symbols) from the heated product can be indexed to the $Fe_3O_4$ phase (JCPDS 88-0315) shown at 330 of graph 300. The electrode made with the hydrothermal precursor (FeOOH) and carbon SWNTs was then heated identically (or substantially identically) to the $Fe_3O_4$ nanorods. Complete reduction to $Fe_3O_4$ was obtained as indicated in the XRD spectra 330 of graph 300 of FIG. 3.

For one of the SWNT purification methods employed to form the electrodes described herein a small amount of non-nanotube carbon and metal catalyst still remained after processing. Any nanotube purification process may be employed prior to or after the claimed/described inventive fabrication processes or steps described herein. It is speculated that any remaining non-nanotube impurities are oxidized and actually may enable the complete reduction to the pure $Fe_3O_4$ phase observed at this relatively low temperature.

Figures 4A, 4B:
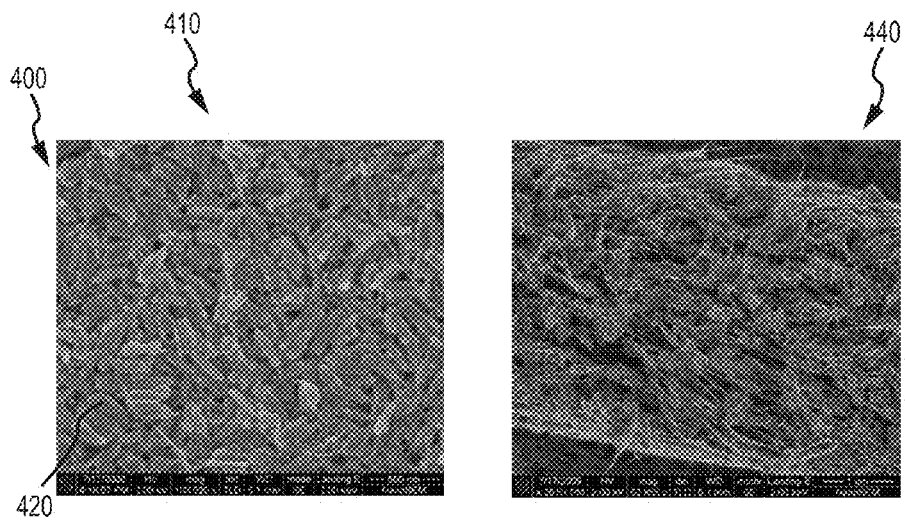
FIG. 4A are photographs showing surface results of scanning electroscope microscopy (SEM) of an electrode formed as taught herein showing mixing of active material in the form of nanorods and a connective matrix in the form of nanotubes or nanotube bundles.
FIG. 4B is a photograph of an SEM providing a sectional view of the electrode of FIG. 4A.

The $Fe_3O_4$ nanorod/SWNT electrode was characterized with scanning electron microscopy (SEM). FIG. 4A shows a surface SEM photograph/image 400 of the electrode which includes bundles or sets of carbon nanotubes 410 forming a conductive net or connective matrix for active material in the form of iron oxide nanorods 120 (not shown in FIG. 4A). FIG. 4B shows a cross-section SEM photograph/image 440 of the electrode. Note, the $Fe_3O_4$ nanorods 420 with an average width of 100 nm are dispersed with a regular pore structure. We believe that the removal of $H_2O$ and reduction of Fe (III) to Fe (II) contribute to the formation of the porous structure. This porosity then aids the diffusion of $Li^+$ ions in the electrode. The SEM images 400, 440 also show that small bundles of SWNTs 410 are interlaced with the $Fe_3O_4$ nanorods 420. As shown, the $Fe_3O_4$ nanorods 420 are substantially uniformly suspended in the SWNT connective matrix provided by the carbon SWNTs 410. A few sub-10 nm metal particles (Ni, Co) from the laser vaporization process may also be detected in the SEM images 400, 440.

Raman spectroscopy was also employed to characterize the $Fe_3O_4$ nanorod/SWNT electrode. As part of the characterization, pure SWNTs were found in the electrode with Raman excitation at 632.8 nm. Raman spectra of the SWNT materials or connective matrix revealed resonantly enhanced tangential bands between 1500-1600 $cm^{-1}$ (G -bands) as well as a broad band at 1350 $cm^{-1}$ attributed to a convolution of the disorder-induced band (D-band) of carbon impurities and the D-band of the SWNTs themselves. The carbon tangential vibrations were strong first-order bands, which included six components with $2A+2E_1+2E_2$ symmetries arising from curvature-induced splitting of the tangential $E_{2g}$ mode of graphite. The line shapes and widths of these modes may vary significantly, depending on how close the laser excitation energy is to the nanotube resonance and whether the nanotube is semiconducting or metallic (e.g., by a semi-conducting material provided as the matrix is considered to be electrically conductive in this description and in the following claims).

Typically the semi-conducting bands are fit with multiple Lorentzians to describe the six Raman active modes, and the metallic tubes are fit with only two peaks, e.g., a Lorentzian line shape describing the dominant higher-frequency feature and a Breit-Wigner-Fano (BWF) line describing the dominant lower frequency feature. The G-band features in the spectra of the pure SWNTs indicate that both semiconducting and metallic nanotubes were present in the purified sample (e.g., the sample includes electrically conductive nanomaterial in the form of semiconducting and metallic carbon SWNTs). It is believed that the inventive electrode and manufacturing processes may be implemented with nanotube samples that are enriched with metallic or semi-conducting nanotubes and/or with nanotubes that are functionalized or have modified electronic properties. Also, the intensity of the D-band in the purified sample suggested the presence of some non-nanotube carbon. Changes in the Raman spectrum of the SWNTs in the electrode after annealing to 450° C. were clearly observed. The loss of intensity of the D-band relative to the G-bands was consistent with the oxidation of some non-nanotube carbon. The change in shape for the G-bands suggested that there was some charge transfer between the nanotubes and the $Fe_3O_4$ nanorods and that the charge transfer preferentially occurred with the semiconducting nanotubes in the electrode. The quenching of the Raman lines in the cycled electrodes was consistent with charge transfer from $Li^+$ that was inserted irreversibly. In situ Raman measurements were also made where the Raman nanotube lines return upon charging the battery to a particular voltage and allowing for the removal of irreversibly inserted $Li^+$.

In another testing process for a prototyped electrode and electrochemical device, the electrochemical performance of the electrodes was characterized using galvanostatic cycling in a coin cell (not shown) with Li metal as the negative electrode. A portion of the testing/analysis of the electrode design is shown in the graph 500 of FIG. 5. The $Li^+$ insertion process in the first two cycles was examined for: (1) a pure SWNT electrode that is labeled "SWNT" and shown at 510; (2) a conventional $Fe_3O_4$ electrode that is labeled "micro1" and shown at 520 (e.g., the micro1 electrode may include 5 μm $Fe_3O_4$ nanorods, which may be obtained commercially from Aldrich or other distributors and be made by mixing the commercial $Fe_3O_4$ with acetylene black (AB) and poly vinylidene fluoride (PVDF) at a weight ratio of 80:8:12); (3) a nano-$Fe_3O_4$ electrode fabricated according to this description with about 5 percent by weight carbon SWNTs and about 95 percent $Fe_3O_4$ nanorods as the active material that is labeled as "nano" and shown at 530; and (4) to further study the effect of particle size on the electrochemical performance, the same fabrication procedure for the nano-$Fe_3O_4$ electrode was also applied to commercial $Fe_3O_4$ (e.g., 5 μm, bought from Aldrich), with is labeled as "micro2" and shown at 540 in FIG. 5.

Figure 5:
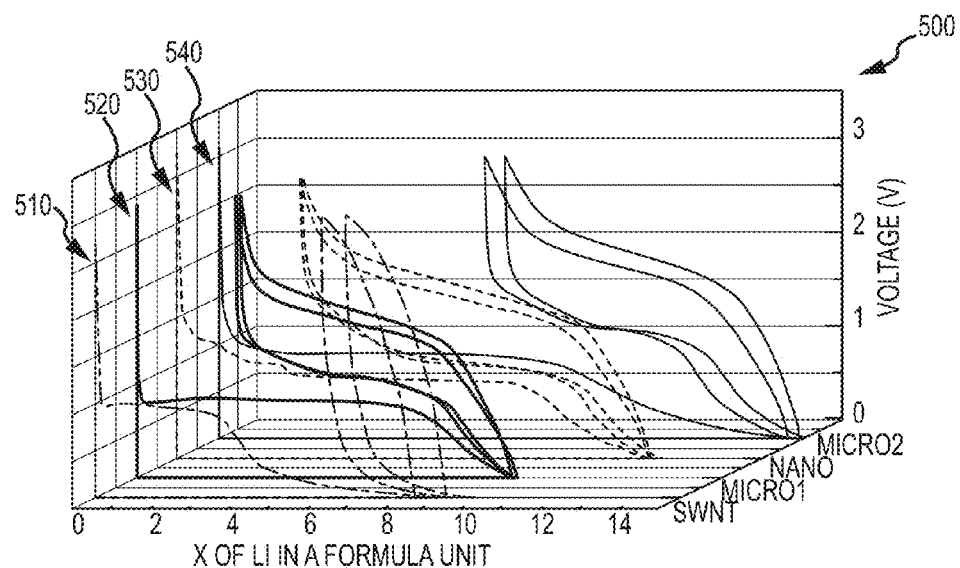
FIG. 5 illustrates voltage composition curves for various electrodes including electrodes formed with SWNTs as a connective matrix for nanorod active material.

All the electrodes were tested under identical conditions in a lithium coin cell. FIG. 5 displays the voltage-composition curves 510, 520, 530, 540 of these four electrodes in graph 500. The cells are cycled here at a low rate of 0.1C (8 Li$^+$ insertion per formula unit in 10 hours) within a 0.005-3.0 V voltage limit. A well-defined plateau is observed at 0.8V, attributed to the reduction process of $Fe_3O_4$ into Fe (II) and Fe (0), for the first discharge curves of "micro1" 520, "micro2" 540, and "nano" 530. The voltage of the SWNT electrode shown at 510 rapidly reaches a plateau at 1.0 V before a smooth and long slope where Li$^+$ intercalation into carbon occurs. The large surface area and the solid electrolyte interphase (SET) formation on SWNTs are the major causes of the large irreversible capacity. During charging, there is no obvious plateau below 0.2 V where Li$^+$ extraction from graphitic carbons usually generally occurs. The Raman data collected discussed above is consistent with irreversible Li ion insertion in the SWNT bundles. Thus, different Li$^+$ insertion/extraction mechanisms appear to be operating in the SWNTs, which will be discussed later.

Compared to the potential curves 520, 540 of the micro-$Fe_3O_4$ electrodes (micro1, and micro2), the voltage in the first discharge curve 530 of the nano-$Fe_3O_4$ electrode drops stepwise before the conversion plateau is observed at 0.8V. Li$^+$ consumption for the formation of the SET layer on the SWNTs and $Fe_2O_3$ nanorods may account for the short plateau around 1 V. Li$^+$ intercalation into the spinel structure of nano-$Fe_3O_4$ and was considered as potentially explaining the smooth slope plus a plateau-like step at 1.2V (e.g., which may be an effect driven by the particle size on the reduction process). The first discharge capacities for the nano-$Fe_3O_4$ electrode and commercial $Fe_3O_4$ electrodes (micro 1 and 2) appear to be higher than the theoretical capacity of $Fe_3O_4$ expected for the reduction of $Fe_3O_4$ by 8 Li$^+$. The initial coulombic efficiency of the nano-$Fe_3O_4$ electrode is ~75%, which is higher than the ~55% coulombic efficiency observed for the commercial $Fe_3O_4$ electrodes (micro2). SET formation on SWNTs and amphorization of microsized $Fe_3O_4$ account for the large irreversible capacity of the microsized $Fe_3O_4$ electrode (micro2). After the first discharge, the nano-$Fe_3O_4$ electrode reaches the theoretical capacity and has a similar voltage profile to the micro $Fe_3O_4$ electrodes, indicating a similar conversion reaction during charge/discharge.

Figure 6:
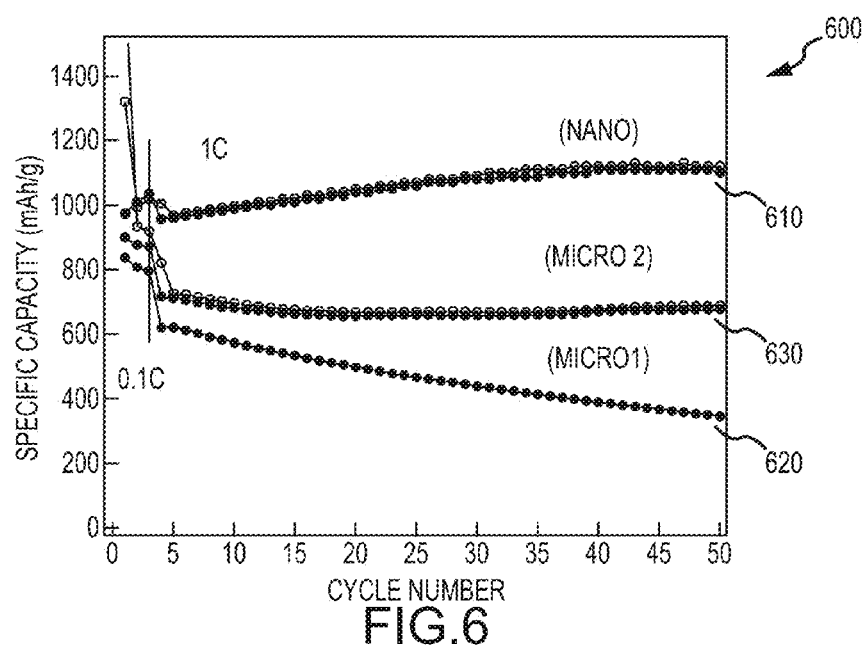
FIG. 6 is a graph comparing specific capacities of several electrodes including ones formed according to the methods taught herein with a nano-connective matrix.

Further, the subsequent 50 cycles were tested at a high current rate of 1C (8 Li per formula unit in 1 hour). FIG. 6 shows with graph 600 the Li$^+$ insertion and extraction capacity per unit mass of the $Fe_3O_4$ particles versus cycle number for the nano electrode at 610, for the micro2 electrode at 630, and for the micro1 electrode at 620. The graph 600 provides a comparison of the specific capacity for various $Fe_3O_4$ electrodes (the proposed nano electrode 610, the micron-size $Fe_3O_4$ electrode made by the new method/micro2 shown at 630, and the micron-size $Fe_3O_4$ electrode made with AB and PVDF as binder/micro1 shown at 620). The capacity of the conventional $Fe_3O_4$ electrode (micro 1) with AB and PVDF deteriorates after the first cycle and loses approximately 50 percent of the initial charge capacity after only 50 cycles. The volume expansion due to the conversion reaction mitigates the structural integrity of the electrode made with AB and PVDF, and results in a degradation of capacity. Although the capacity of the second commercial $Fe_3O_4$ electrode (micro 2) decreases to about 600 mAh/g after cycling at 1C rate, the capacity remains at 600 mAh/g for 50 cycles. This demonstrates that the new fabrication method greatly improves the cycling performance even for the micro-size material and that it may be important to any battery electrode technology.

The best result in this test was obtained in the nano-$Fe_3O_4$/SWNT electrode (nano shown at 610). After the first 3 cycles at the low cycling rate of 0.1C, the capacity still remains constant and then slightly increases while cycling at 1C rate. The rise in capacity is not surprising for the nano-$Fe_3O_4$ electrode, although it is very rarely observed when an intercalation mechanism is occurring. One reason may be that a gel-like film from the decomposition of the electrolyte at low voltage plays a crucial role in the capacity increase. The intrinsic properties of SWNTs coupled with the "conductive SWNT net" or electrically conductive, connective matrix/net allow for volume expansion and improved conductivity. During testing, it was found that the conductivity was increased from 1500 ohms/square for the commercial $Fe_3O_4$ electrode (micro1) to 50 ohms/square for the nano-$Fe_3O_4$ electrode with 5 wt. % SWNTs (nano).

Figure 7:
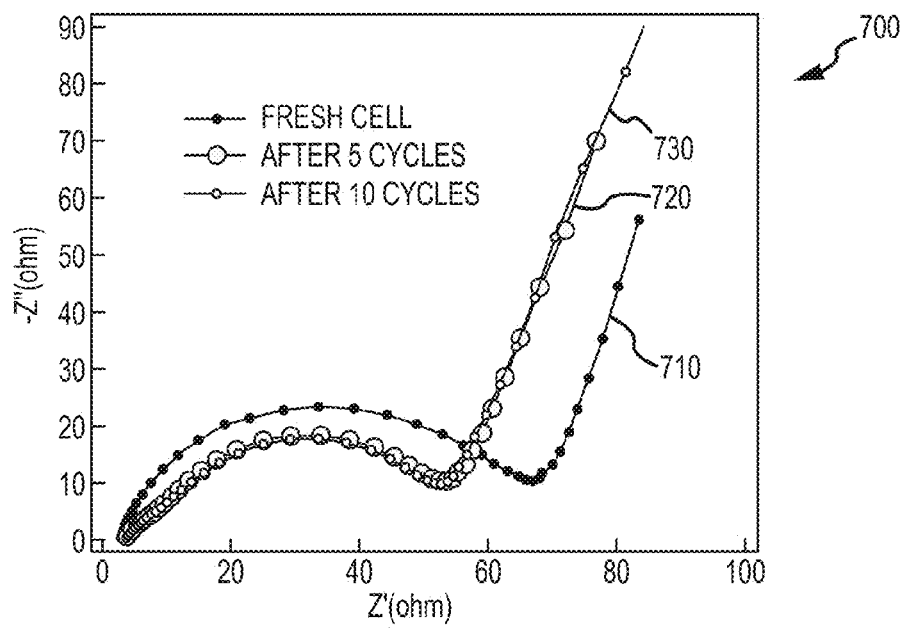
FIG. 7 illustrates an AC impedance spectra of several tested lithium cells fabricated with an electrode described herein.

As shown in the graph 700 of FIG. 7, impedance measurements on the fresh and cycled cells are presented in Nyquist polts (Z' vs −Z") at 710 for a fresh cell, at 720 for a cell after 5 cycles, and at 730 for a cell after 10 cycles. The profiles 710, 720, and 730 were obtained at open circuit voltage in the frequency range from 10 mHz to 100 kHz. The depressed semicircle in the high frequency range followed by a straight line in the low-frequency range is observed for the cell. Differing from the Warburg impedance that usually exhibits a 45° slope straight line, the straight line observed here indicates capacitive behavior. The capacitive behavior may be attributed to lithium intercalation in the SWNTs. The size of the semicircle for the cycled cell is smaller than that for the initial cell, indicating that the barrier to the charge transfer process is reduced. The Nyquist plot 730 after the 10$^{th}$ cycle resembles that of the fifth cycle. This appears to confirm that the Li$^+$ insertion/extraction in the electrode is reversible.

Figure 8:
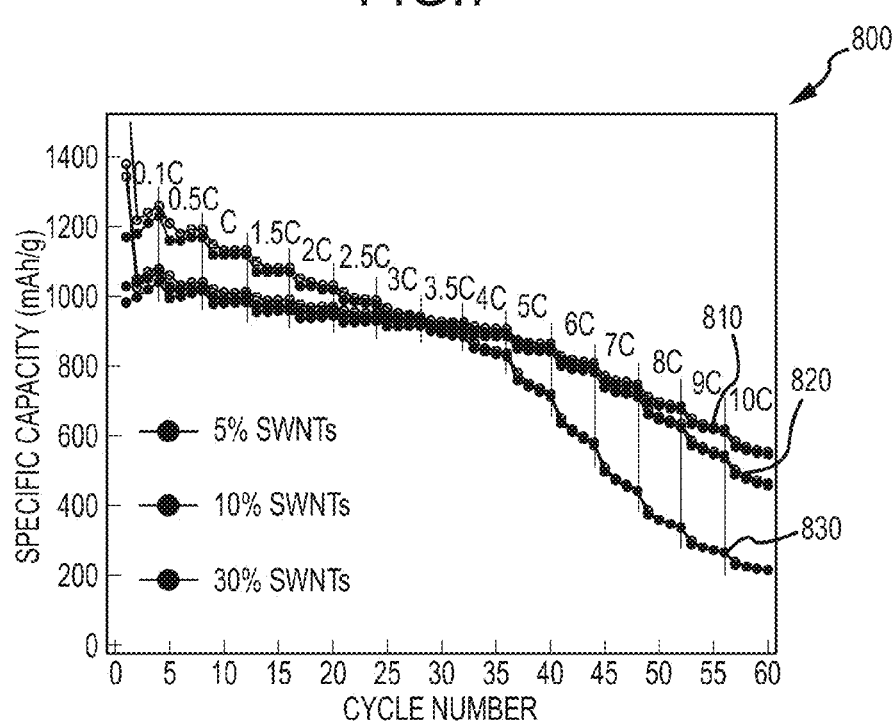
FIG. 8 shows rate capabilities of electrodes with nano-connective matrices as taught herein with differing amounts of SWNTs (or differing weight percentages of the connective matrix material)
Figure 9:
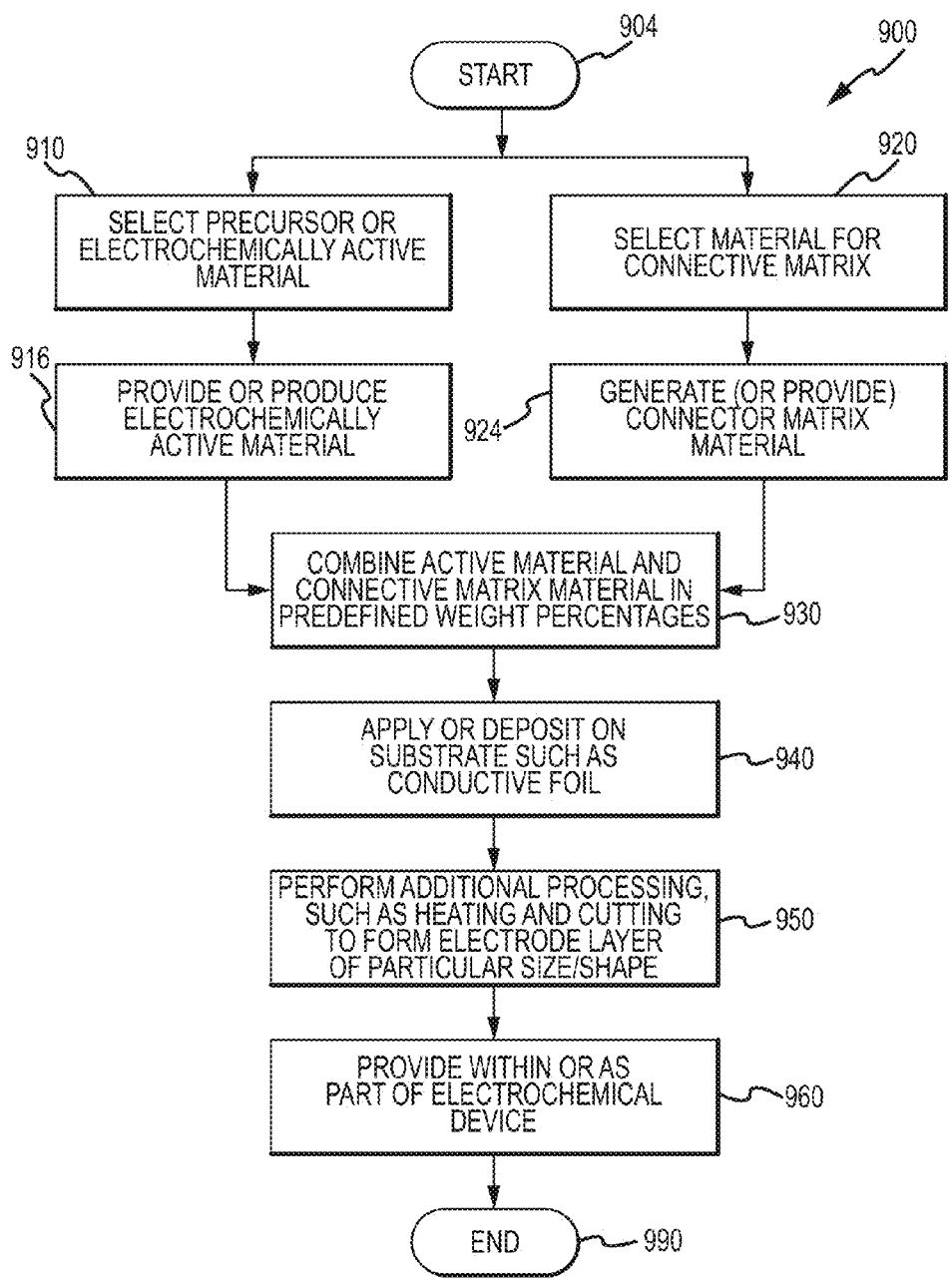
FIG. 9 is a flow chart of a method of forming an electrochemical device with an electrode with a connective matrix in which an active material is supported.

The truly high rate capability of the nano-$Fe_3O_4$/SWNT electrode taught by this description is displayed in FIG. 8 with graph 800 showing plot 810, 820, and 830 for electrodes having differing amounts of matrix/net material (e.g., 5, 10, and 30 percent by weight, respectively, of carbon SWNTs in this example). The cells were cycled at different rates from 0.1C to 10C in the voltage range from 0.005 V to 3 V. The electrodes were fabricated with various ratios of nano active material and carbon SWNTs as shown and were tested to establish the effect of the SWNTs for high-rate capability. The cycling behavior for nano-$Fe_3O_4$ electrodes with 5% SWNTs, 10% SWNTs, and 30% SWNTs are shown in FIG. 8 at 810, 820, and 830, respectively. The best performance in this particular test or implementation was obtained by using the nano-$Fe_3O_4$ electrode with 5% SWNTs. This cell had a capacity of 550 mAh/g at 10C (i.e., 8 Li per formula unit in 6 minutes), while the cell with 30% SWNTs had a capacity of 200 mAh/g after 60 cycles with increased rate. The electrode with 30% SWNTs also had a larger irreversible capacity.

Based on these test results, there appears to be a significant ratio between the SWNTs and the nano active material. At high SWNT loadings, the nanotubes agglomerate into larger bundles in providing the connective matrix, leading to an uneven distribution of SWNTs and $Fe_3O_4$ nanorods that results in a loss of electrical conductivity and a reduction in the rate capability. The SEI formation on the electrode containing 30% SWNTs accounts for the higher irreversible capacity. The durability of a nano-$Fe_3O_4$ electrode was also tested with 5% SWNTs at a high rate of 5C (4360 mAg$^{-1}$)

and was found acceptable. The capacity at 5C rate is 850 mAh/g in the initial cycle and slowly decreases to 790 mAh/g after 60 cycles.

To summarize these testing results, a uniform suspension of $Fe_3O_4$ nanorods in a "conductive net" made with carbon SWNTs was fabricated via simple vacuum filtration. The highest reversible capacity was obtained using about 5 percent by weight carbon SWNTs in the binder-free electrode. The reversible capacity of the anode reaches 1000 mAh/g at C rate and is sustained over 100 cycles with a useful volumetric capacity. Furthermore, the electrodes provide a high rate capability and a stable capacity of approximately 800 mAh/g at 5C (60 cycles) and a stable capacity of approximately 600 mAh/g at 10C. These results suggest that the described and suggested nano-$Fe_3O_4$/SWNT electrode is a promising candidate for an anode in high-performance Li-ion batteries for electric vehicles as well as an electrode layer for many other electrochemical devices.

FIG. 9 illustrates one method 900 for fabricating an electrochemical device with a nano-metal oxide active material, binder-less electrode described herein. The method 900 begins at 904 such as by designing of a particular device to be fabricated such as lithium-ion battery or the like, and this step 904 may include defining energy densities desired, durabilities, rates, and other physical and/or operating parameters for the device. With this design information in mind, the method 900 continues at 910 with selection of an electrochemically active material and/or its precursor. For example, it may be desirable to provide a particular metal oxide in the form of nanorods as the active material of the electrode, and step 910 may include selecting this material and also the precursor to obtain the active material (e.g., iron oxyhydroxide nanorods may be used as a precursor for forming iron oxide nanorods). At 916, the electrochemically active material may be produced (such as by producing iron oxide nanorods from iron oxyhydroxide nanorods) or simply provided as the output of another process or as obtained commercially from a distributor.

At 920, the method 900 may include selecting a material for use as the connective matrix of the electrode. Typically, this may be nearly any semiconductor or conductor nanomaterial or nanoparticles such as carbon in the form of single, double, or multi-wall nanotubes or in the form of fullerenes (e.g., buckyballs or the like), carbon fiber, graphene, and/or any carbon based nanostructured material including doped carbon nanostructures, e.g., boron or nitrogen-doped nanotubes and/or BCN nanostructures or the like, and it may be selected to suit the chosen active material (or vice versa). The carbon nanotubes or other nanoparticles may be formed at 924 (or simply obtained from a distributor or as the output of a separate process) in a variety of ways such as via laser vaporization, chemical vapor deposition (CVD), plasma enhanced CVD, wet chemical synthesis, arc generated, hot-wire CVD, and/or other techniques. The processing may result in a variety of impurities that may be allowed to remain for use in the electrode (such as some amount of carbon MWNTs and fullerenes in a volume of carbon SWNTs) or be removed as undesirable impurities (e.g., to obtain relatively high purities such as greater than 90 percent SWNTs or even up to 99.5 percent or higher purity carbon SWNTs in some cases).

At 930, the active material and the connective matrix material are combined in predefined weight ratios so as to provide a substantially uniform mixing or distribution of the carbon SWNTs or other active material in the net or matrix formed by the conductive additive. For example, the matrix material may be provided at step 930 at 2 to 30 percent by weight while the active material would make up the rest of the electrode material (e.g., 98 to 70 percent by weight). In some embodiments, the matrix material makes up about 5 to 10 percent by weight of the electrode such as in some carbon SWNT implementations useful for lithium-ion batteries and other electrochemical devices. At 940, the mixed electrode material is applied such as via vacuum filtration and then transfer to a substrate such as a conductive foil or the like. At 950, the method 900 includes performing additional processing, such as heating and/or cutting/shaping to form an electrode layer or electrode of particular size and shape to suit a device stack or device. At 960, the method 900 includes providing or installing the electrode in an electrochemical device such as in an energy storage stack on abutting an electrolyte or the like. The method 900 then may end at 990.

It may be useful at this time to more fully describe fabrication of a nano-$Fe_3O_4$ electrode that was tested as described above. It will be understood, though, that the fabrication techniques may be modified to allowing scaling up to support commercial fabrication of electrodes and electrochemical devices with such electrodes. In one particular implementation, iron oxyhydroxides (FeOOH) nanorods were employed as a precursor to make iron (II, III) oxide ($Fe_3O_4$) electrodes with a hydrothermal process. Iron (III) chloride ($FeCl_3$, 2.5 mmol) was dissolved in 7 ml of distilled water and heated to 50° C. Sodium hydroxide (NaOH, 10 mmol) was dissolved in 5 ml of distilled water and then added to the above iron chloride solution "dropwise." The mixture was stirred for 30 minutes to form a homogeneous gel before it was transferred into a Teflon-lined stainless steel autoclave. The reaction was maintained at 160° C. for 24 hours. After the reaction was completed, the resulting yellow solid product was rinsed with distilled water and dried at 80° C. under vacuum.

Raw material containing single-wall carbon nanotubes was produced by a known laser vaporization techniques. Large agglomerations of amorphous and non-nanotube carbon and metal nanoparticles (Ni, Co) were observed in the as-produced raw SWNTs. Most of the non-nanotube carbon and metal catalyst particles were simply removed by an $HNO_3$ reflux/air oxidation procedure. Vacuum filtration, e.g., techniques known for use to prepare a carbon nanotube film, was used to fabricate the nano-$Fe_3O_4$/SWNT electrode. FeOOH nanorods from the hydrothermal process and SWNTs were suspended in 1% sodium dodecyl sulfate (SDS) solution and sonicated for 15 minutes before vacuum filtration. The mixture was rinsed three times with deionized water and then transferred to copper foil pretreated with a water and ethanol rinse. The electrode was baked in an argon atmosphere at 450° C. for 1 hour to complete the conversion from FeOOH to $Fe_3O_4$.

Regarding characterization of the formed electrode, the analysis to confirm the uniform distribution of $Fe_3O_4$ was investigated by a scanning electron microscope (FEI NOVA 630). X-ray diffraction data were collected on a powder Scintag X-ray Diffractometer operating at 45 kV and 36 mA and using Cu-Kα radiation. Raman spectroscopy was performed using 632.8 nm (1.96 eV) laser excitation. The back-scattered light was analyzed with a Jobin Yvon 270M spectrometer equipped with a liquid-nitrogen-cooled Spectrum One CCD and holographic notch filters. Averaging three 30-second scans was sufficient to obtain high intensity, well-resolved Raman spectra. Coin cells were assembled in an argon-filled dry box using the binder-free electrode as the positive electrode and Li metal as the negative electrode. A Celgard separator and 1 M $LiPF_6$ electrolyte solution in EC:DEC/1:1 (mass ratio) purchased/available from Nanolyte were used to fabricate the coin cells. The cells were first galvanostatically cycled between 3 and 0.005 V for three cycles at a rate of 0.1 C (8 Li$^+$ per formula unit in 10 hours), which was used to complete the conversion reaction with lithium. Subsequently, the cells were cycled at different rates. All electrochemical impedance spectra were obtained using the computer-interfaced VMP3 (Biologic Claix France) potentiostat with a 5 mV AC signal ranging from 10 mHz to 100 kHZ.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope. The term non-nanoparticles is intended to include at least micron-sized or scale particles and non-nano sized single crystals (such as millimeter-sized particle single crystals and the like).

The invention claimed is:

1. A method of making a binderless electrode material, the method comprising:
    combining an electrochemically active precursor material comprising iron oxyhydroxide nanoparticles and an electrically conductive material comprising carbon nanoparticles to form a material;
    mixing the material with a sodium dodecyl sulfate solution to form a mixed material;
    filtering the mixed material to form a mixed electrode material;
    transferring the mixed electrode material to a conductive substrate; and
    heating the transferred mixed electrode material and the conductive substrate in an inert atmosphere, such that at least a portion of the iron oxyhydroxide nanoparticles is converted to iron oxide nanoparticles suspended within the electrically conductive material.

2. The method of claim 1, wherein the carbon nanoparticles comprise at least one of boron or nitrogen.

3. The method of claim 1, wherein the heating is performed such that the transferred mixed electrode material reaches a temperature up to 450° C.

4. The method of claim 1, wherein the mixing further comprises sonicating the mixed material.

5. The method of claim 1, wherein the conductive substrate is a metal foil.

6. The method of claim 1, wherein the inert atmosphere comprises argon.

7. The method of claim 1, wherein the carbon nanoparticles comprise at least one of single-wall carbon nanotubes, double-wall carbon nanotubes, multi-wall carbon nanotubes, boron-doped carbon nanotubes, or nitrogen-doped carbon nanotubes.

8. The method of claim 1, further comprising, prior to the combining, reacting a mixture comprising iron (III) chloride, sodium hydroxide, and water to produce the iron oxyhydroxide nanoparticles.

9. The method of claim 8, wherein the reacting is performed at a temperature of 160° C.

10. The method of claim 1, wherein the iron oxyhydroxide nanoparticles comprise nanorods.

11. The method of claim 1, wherein the iron oxide nanoparticles comprise $Fe_3O_4$.

* * * * *